United States Patent [19]

Steffy

[11] Patent Number: 5,587,719
[45] Date of Patent: Dec. 24, 1996

[54] AXIALLY ARRAYED HELICAL ANTENNA

[75] Inventor: David A. Steffy, Herndon, Va.

[73] Assignee: Orbital Sciences Corporation, Dulles, Va.

[21] Appl. No.: 191,247

[22] Filed: Feb. 4, 1994

[51] Int. Cl.$^6$ .............................. H01Q 1/36; H01Q 11/08
[52] U.S. Cl. ............................................ 343/895; 343/853
[58] Field of Search ................................... 343/725, 895, 343/844, 853, 881, 893; H01Q 1/36, 11/08, 21/00, 21/12, 21/24, 21/30

[56] References Cited

U.S. PATENT DOCUMENTS

| | | | |
|---|---|---|---|
| 2,953,786 | 9/1960 | Krause | 343/895 |
| 3,019,438 | 1/1962 | Pan | 343/895 |
| 3,670,358 | 6/1972 | Schwartz et al. | 16/150 |
| 3,906,509 | 9/1975 | DulHamel | 343/895 |
| 4,475,111 | 10/1984 | Gittinger et al. | 343/895 |
| 5,138,331 | 8/1992 | Josypenko | 343/895 |
| 5,170,176 | 12/1992 | Yasunaga et al. | 343/895 |
| 5,191,352 | 3/1993 | Branson | 343/895 |
| 5,194,873 | 3/1993 | Sickles | 342/374 |
| 5,198,831 | 3/1993 | Burrell et al. | 343/895 |
| 5,204,981 | 4/1993 | Karasawa et al. | 455/277.1 |
| 5,215,824 | 6/1993 | Munro et al. | 428/473.5 |
| 5,255,005 | 10/1993 | Terret et al. | 343/895 |
| 5,274,388 | 12/1993 | Ishizaki et al. | 343/895 |

FOREIGN PATENT DOCUMENTS 1015368  7/1964  United Kingdom .

OTHER PUBLICATIONS

R. A. Clark and T. S. M. Maclean, "Series and Parallel–fed Linearly Polarized Helical Aerials," *The Radio and Electronic Engineer*, pp. 67–71 (Jul., 1964).

C. W. Gerst and R. A. Worden, "Helix Antennas Take Turn For Better," *Electronics*, pp. 100–110 (Aug. 22, 1966).

Kraus, *Antennas*, Chapter 7—"The Helical Antenna," pp. 265–339, 1988 no month.

*Primary Examiner*—Michael C. Wimer
*Attorney, Agent, or Firm*—Jenner & Block

[57] ABSTRACT

The present invention comprises an axially arrayed helical antenna system adapted for use in a variety of broadcasting or receiving stations including a low Earth orbiting communication satellite station. The helical antenna array comprises a plurality of antenna structures each including at least one helical antenna element coaxially mounted on a common mounting structure with a separating distance between them. Each element is electromagnetically coupled to a corresponding element of the subsequent antenna structure in the array to form a separate, isolated antenna. A feeding means is included for supplying appropriately phase shifted signals to the elements that comprise each antenna. In addition, in accordance with the invention, additional independent antennas or other equipment or payload can be deployed in the separating distance between the arrayed antenna structures.

10 Claims, 8 Drawing Sheets

AXIALLY ARRAYED HELICAL ANTENNA

FIELD OF THE INVENTION

The present invention relates to antennas for use in communication systems. More specifically, the present invention relates to a helical antenna system that is axially arrayed and is capable of application in a wide variety of communication systems, particularly in space-based satellite communication systems.

BACKGROUND OF THE INVENTION

Helical antennas are well known in the art. A standard helix antenna, as described in Kraus, J. D., *Antennas* (McGraw-Hill 1988), ch. 7, consists of a single wire helically wound in fractions of a turn or in one or more turns along the antenna axis. The helical antenna emits a circularly polarized radio wave that is particularly favored for satellite communication systems owing to the variations in geometry between the received and transmitted signals characteristic of such systems. Electrically short helices (where the number of turns is less than one) produce a nearly circular radiation pattern. It has been found that in order to produce a well defined (directive) beam with maximum gain in the direction of the helical axis, a helical antenna with multiple turns is required. In general, the more turns of the helix the more directive the antenna becomes.

A variation on the single conductor helical antenna is described by C. C. Kilgus in "Resonant Quadrifilar Helix Design," *Microwave Journal*, (December 1970), pp. 49–54. Kilgus describes a quadrifilar helix antenna having four conductors each $\lambda/2$ long formed in a ½-turn helix. Each of the four legs of this antenna is fed a signal 90° apart in phase (i.e., in phase quadrature). The ½-turn quadrifilar helix described by Kilgus produces a hemispherical cardioid (heart-shaped) radiation pattern. The quadrifilar helix structure is preferred for applications requiring a broadbeamed radiation pattern because of the relatively short conductor lengths ($\lambda/2$) required. Moreover, the quadrifilar helix antenna emits a highly circularly polarized waveform (axial ratio close to 1) over most of its wave pattern. Circular polarization is favored for orbital satellite communication systems owing to the constantly varying geometry between the orbiting satellite and the ground station.

As is the case for the single conductor helix, by increasing the number of turns the quadrifilar helix becomes more directive. In general, multi-turn helical antennas produce a wave pattern with maximum gain in the direction of the axis of the helix (i.e., on boresight). This gain pattern is desirable for many applications, but is generally undesirable for satellites in low Earth orbits. At any point in time, an orbital communication satellite must transmit to users on the surface of the Earth directly along the axis of the helical antenna (i.e., at nadir), as well as at the limb of the Earth's surface (i.e., the communication horizon of the antenna at oblique angles to the helical axis). Because the slant range is far greater for communications at the limb of the Earth than those at nadir for low altitude satellites, communication path losses are greater. Therefore, for these satellites, a more optimal antenna wave pattern would have maximum gain somewhat off the helical axis, with the gain decreased 0–20 dB on boresight.

For the quadrifilar helix antenna, the maximum gain can be shifted away from the main axis by increasing the number of turns and the pitch angle of the helical elements. Therefore, quadrifilar helices of two to five turns are common in low-altitude spacecraft designs, because the radiation pattern can be adjusted to almost perfectly offset the communication path loss. However, the physical dimensions of such antenna systems become quite large. For example, a two-turn antenna operating at a frequency range of 137 to 150 Mhz is up to eight inches in diameter and between 110 and 300 inches long. Moreover, the antenna dimensions must be even larger if more gain is required. In general, the maximum gain that can be achieved by the antenna is proportional to the square root of the helix length. An antenna system of such large dimensions is particularly problematic in spacecraft applications where payload space is at a premium.

One solution to this problem is to create an array of smaller helical antennas having the characteristics of a single large antenna. Arrays of individual antenna elements are common, and the electrical properties of the combination are well known. The gain pattern of an antenna array is defined by the number of array elements, their physical spacing and their electrical phasing (equivalent to their electrical spacing). A desired gain pattern can be achieved with a variety of different array configurations.

Generally, antenna elements can be arrayed axially (longitudinally) or broadside (side-by-side). In prior helical antenna systems, the helical antenna elements have been arrayed broadside separated by distances measured in fractions of or multiples of one or more wavelengths ($\lambda$). However, the physical space and side-by-side orientation required by broadside arrays make their implementation less practical for certain applications, such as for space-deployed antenna systems. Moreover, with broadside arrays, independent non-arrayed antennas cannot be interleaved between the arrayed elements because the radiation patterns of the individual elements would interact.

Therefore, there is a need to provide an antenna array comprised of helical antenna elements that is size efficient and that permits independent, interleaved antenna systems or other equipment or payload to be deployed within the physical space between the array elements.

SUMMARY OF THE INVENTION

The principal object of this invention is to provide an improved antenna array that overcomes the limitations of prior antenna systems. More specifically, it is an object of the invention to provide a new antenna structure of an efficient size that comprises axially arrayed individual antenna elements and that emits a circularly polarized wave. It is another object of the invention to provide an axial antenna system comprising multiple independent, electromagnetically isolated antennas. The antenna system of the present invention can be used for satellite communication systems where circular polarization is desired and where the total size and weight of the antenna system must be minimized.

In accordance with the present invention, the antenna structure includes a plurality of individual, axially arrayed helical antenna elements that share a common axis and have a separating distance between them in the axial direction. As a result of this separating distance or gap, axial arrays require a greater overall length than broadside arrays. While this greater length may be a disadvantage in many applications, the present invention advantageously utilizes the separating gaps between the array elements. The array elements are fed a common signal that is shifted in phase by a specified number of degrees. When excited, the antenna array acts as a single antenna emitting a wave having substantially circular polarization with a radiation pattern defined by the construction of the array elements, the distance between the array elements and the phase distribution of the feed signal.

The antenna structure of the present invention occupies far less volume than non-arrayed antennas that produce the equivalent wave pattern. The peak gain of the axially arrayed antenna is proportional to the overall length of the antenna elements placed end-to-end rather than to the square root of the length as in a single element antenna. In other words, the antenna array requires less aperture than the equivalent single element antenna. In addition, the breakup of the continuous volume using individual array elements axially aligned allows the entire array to be folded upon itself for compact stowage.

In the antenna structure of the present invention, each structural element may consist of a pair of separate antenna array elements: a right-handed helical structure and a left-handed helical structure. When electrically coupled with the corresponding left or right hand array element, respectively, of subsequent structural elements, the coupled right-handed helical array elements and the coupled left-handed helical array elements act as a right-handed polarized antenna and an independent left-handed polarized antenna, respectively.

In another aspect of the invention, additional electromagnetically isolated antennas (whether or not comprised of arrays) can be disposed in the unused space between array elements. Several desirable antenna structures can be used as an interleaved antenna, including a quadrifilar helical structure of the same type as the antenna array elements. When independently fed, there is virtually no interaction between the antenna array and the interleaved antenna, thus each operates independently. Other equipment or payload can also advantageously occupy the axial gaps in an axial array in spacecraft applications.

Other objects and features of the invention will be apparent from the following description and from the drawings.

DETAILED DESCRIPTION OF THE INVENTION

Figure 1:
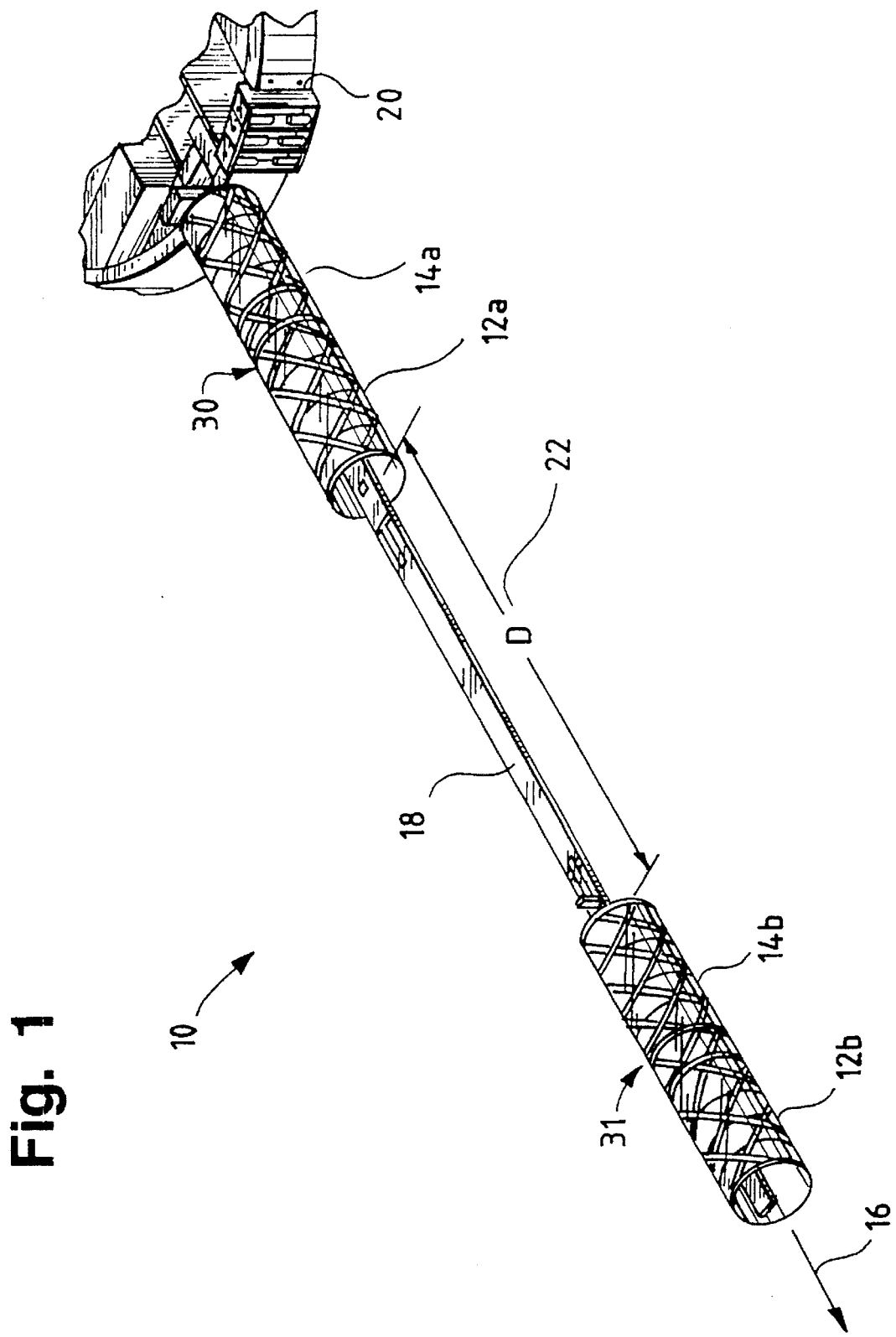
FIG. 1 is a perspective view of the helical antenna array of the present invention in its deployed position and attached to a satellite.

With reference to FIG. 1, the antenna system 10 of the present invention includes a plurality of individual axially arrayed helical antenna structures 30 and 31 sharing a common antenna axis 16. Such structures 30 and 31 could each comprise an array element of a single antenna. In the preferred embodiment illustrated in FIG. 1, on the other hand, antenna structures 30 and 31 each comprise a pair of antenna elements 12a/14a and 12b/14b, respectively. The conductive segments of one element (12a and 12b) of each of the structures 30 and 31 are wound in one direction forming a left-handed helical element and the conductive segments of the other elements (14a and 14b) are wound in the opposite direction forming a right-handed helical element. When helical structures 30 and 31 are arrayed in accordance with the present invention, each antenna element (12a and 14a) is electromagnetically coupled to the corresponding antenna element (12b and 14b, respectively) to form two separate antennas 12 (comprised of elements 12a and 12b) and 14 (comprised of elements 14a and 14b), each emitting a waveform of opposite polarity as described below.

The antenna structures are mounted to a boom 18 which extends vertically from orbiting communication satellite 20. Boom 18 also includes means (not shown) for feeding signals to the individual elements of the antenna system. Although the invention is illustrated for use in satellite communication systems, the invention is also suitable for operation in other modes. For example, an antenna system in accordance with the present invention could also be constructed for use with other types of spacecraft or with a ground-based communication system. The general construction of antenna system 10 is disclosed in a copending application, assigned to the assignee of the present invention, for a "Self-Deploying Helical Structure," Ser. No. 08/192,324 filed on Feb. 4, 1994, now abandoned, and filed as continuation application Ser. No. 08/561,216, filed on Nov. 21, 1995, the disclosure of which is hereby incorporated by reference into the present application.

Figure 2:
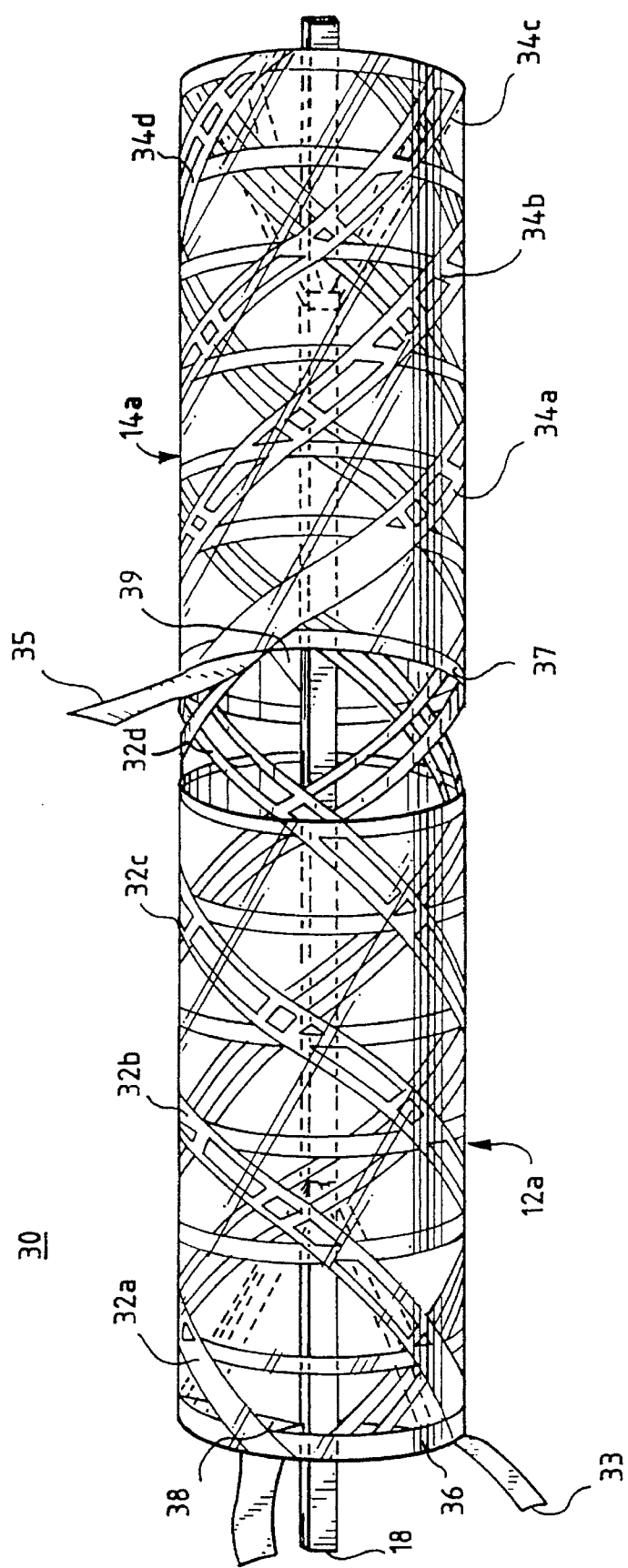
FIG. 2 is a perspective view of one of the antenna elements shown in FIG. 1.

In the preferred embodiment shown in FIG. 2, each antenna element 12a and 14a of antenna structure 30 is a quadrifilar helical antenna comprising four conductors helically wound about the outer diameter of antenna structure 30. In the illustrated construction, the four conductors of the quadrifilar helix comprising element 12a are formed by four conductive strips 32a, 32b, 32c and 32d that are wound in the same direction around the outer diameter of the antenna structure, and the four conductors of the quadrifilar helix comprising element 14a are formed by four conductive strips 34a, 34b, 34c and 34d wound in the same direction around the outer diameter of the antenna structure. The four conductive strips of elements 12a and 14a terminate at a support ring 36 and 37, respectively, from which extend four conductive segments 38 and 39, respectively, for supplying signals to or receiving signals from the helical antenna. In addition, each conductive strip 32(a–d) and 34(a–d) has a conductive extension 33 and 35, respectively, that extends beyond the signal carrying segments 38 and 39, respectively. When the four helical conductive strips of elements 12a and 14a are fed a signal, conductive extensions 33 and 35 emit a small amount of cross-polarized energy in a direction opposite to that of the direction of fire of elements 12a and 14a. This tends to cancel any backside radiation and focus the antenna energy on the communications path. Although the preferred embodiment of the present invention utilizes a quadrifilar helix antenna, other antenna structures can be used in accordance with the invention. For example, antenna elements 12a and 14a each could be a monofilar or bifilar helix antenna.

As noted above, antenna structure 30 is comprised of two separate antenna elements 12a and 14a. Conductive strips 32(a–d) of first antenna element 12a are wound in one direction forming a left-handed quadrifilar helix antenna, and conductive strips 34(a–d) of second element 14a are wound in the opposite direction forming a right-handed quadrifilar helical antenna. Antenna structure 31 is constructed identically to structure 30. When excited in phase quadrature in the manner described below, each antenna element 12a and 12b emits a wave of opposite polarity and thus each forms an independently operating antenna. In addition, left-handed segment 12a and right-handed segment 14a can be axially arrayed with corresponding left-handed and right-handed elements 12b and 14b of an identical second helical structure 31 to create two independent arrayed antennas 12 and 14 as described below.

The quadrifilar antenna element 12a radiates a circularly polarized wave when the four helical conductors 32a, 32b, 32c 32d are fed a signal in phase quadrature, that is, when each conductor is fed 90° apart in phase. Antenna element 12a is fed in a known manner as illustrated schematically in FIG. 3. Feed board circuits 42 and 44 split a transmission signal into four separate signals 0°, 90°, 180° and 270° apart in phase. Each of feed boards 42 and 44 contains a 90° hybrid coupler 46 and two 180° hybrid couplers 48 and 50. Input signal 52 is fed into one of the inputs of coupler 46 and the other input of coupler 46 is connected to the ground through a 50 ohm load 54 to provide a balanced terminal impedance. The two outputs 56 and 58 of coupler 46 are shifted 0° and –90°, respectively, with respect to input signal 52. Outputs 56 and 58, respectively, feed the inputs of the two 180° couplers 48 and 50. The outputs 60 and 62 (phase shifted 0° and –180°, respectively, from input signal 52) of 180° coupler 48 are fed, respectively, to diametrically opposed helical antenna conductors 32a and 32c. Similarly, outputs 64 and 66 (phase shifted –90° and –270°, respectively, from input signal 52) of 180° coupler 50 are fed, respectively, to diametrically opposed conductors 32b and 32d. As a result, the excitation in phase quadrature of first quadrifilar helix element 12a is produced.

Figure 3:
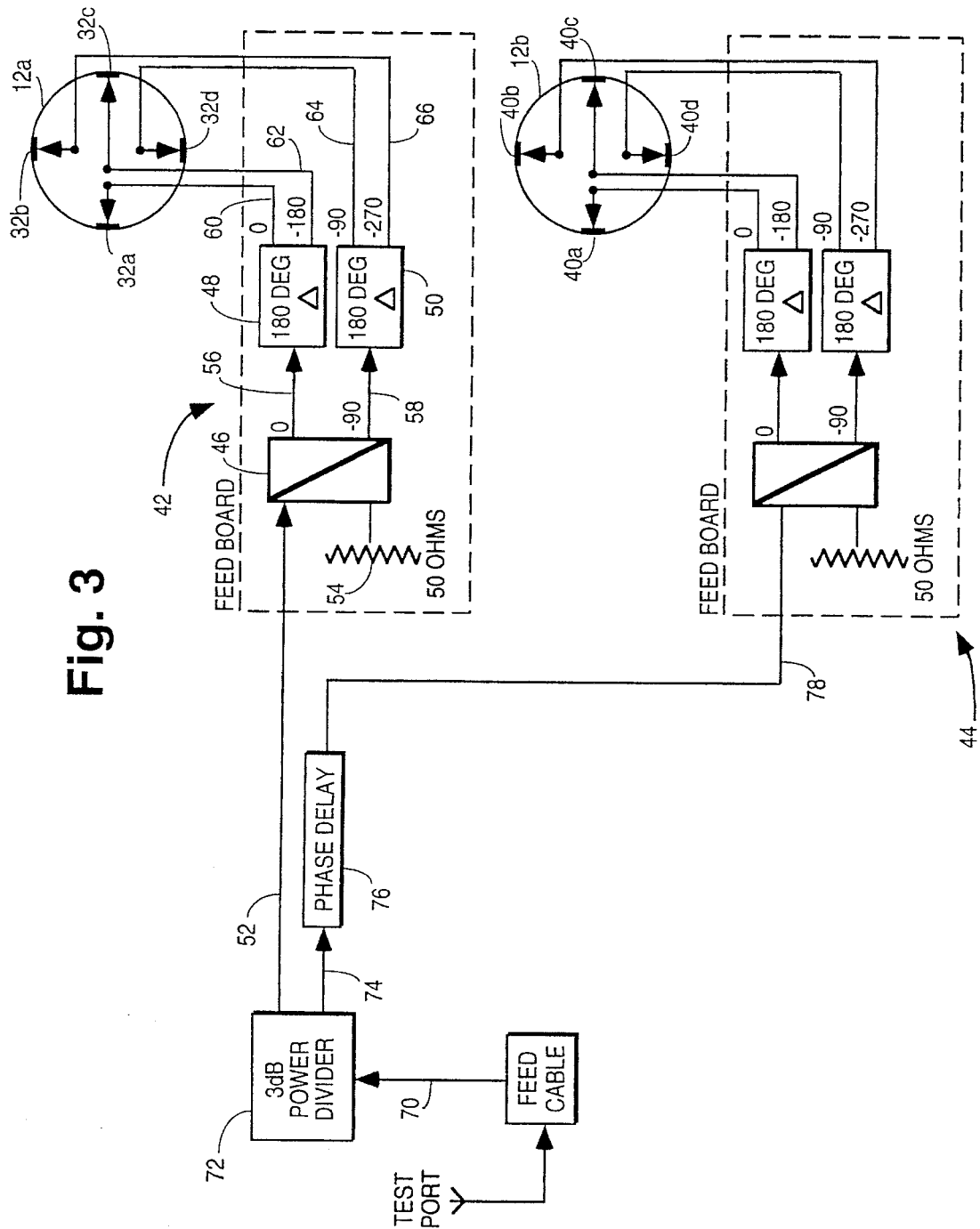
FIG. 3 is a schematic block diagram of the feeder structure for the antenna array of FIG. 1.

The other array elements 14a, 12b and 14b also are fed in the manner illustrated schematically in FIG. 3. In the illustrated example, feed board 42 feeds array element 12a and feed board 44 feeds array element 12b of the first arrayed antenna 12. Transmission signal 70 is divided by a 3 dB power divider 72 into two separate signals 52 and 74 of equal power. The first input signal 52 is fed to antenna array element 12a through feed board 42 as described above. Second input signal 74 is shifted in phase by coupling module 76 and fed via feed cable 78 to feed board 44. The total phase shift of signal 74 between power divider 72 and feed board 44 is the sum of the phase delay produced by module 76 and the phase delay caused by the additional length of signal cable 78 required to transmit the signal to feed board 44 (i.e., to antenna element 12b). Feed board 44 then divides the shifted signal into four separate signals 0°, 90°, 180° and 270° out of phase to excite the four helical conductors 40a, 40b, 40c and 40d of second antenna element 12b in phase quadrature in the same manner as feed board 42. Although the feed circuit has been described with reference to an antenna having two elements in an array, it will be appreciated that any number of antenna elements can be accommodated by adding additional feed board circuits and by varying the gain of power divider 72 accordingly.

In accordance with the invention, an antenna system with a desirable wave pattern can be constructed of axially arrayed helical antenna elements, without the size inefficiencies associated with a single element design or the side-by-side orientation required of prior broadside antenna arrays. With reference to FIG. 1, individual antenna structures 30 and 31 are mounted to a boom 18 so that the helical elements share a common axis 16. The helical structures are spaced apart by a distance 22 along the helical axis 16. When corresponding antenna elements (for example, elements 12a and 12b) are fed a common signal shifted in phase by the feed structure shown in FIG. 3 and described above, arrayed pair 12a and 12b and arrayed pair 14a and 14b each operate as a single antenna that generates a characteristic circularly polarized wave pattern. By varying the conductor length, the number of turns or the pitch angle of each element, the distance between the elements and the electrical phasing between the elements, a variety of desired gain patterns can be achieved.

Figure 4:
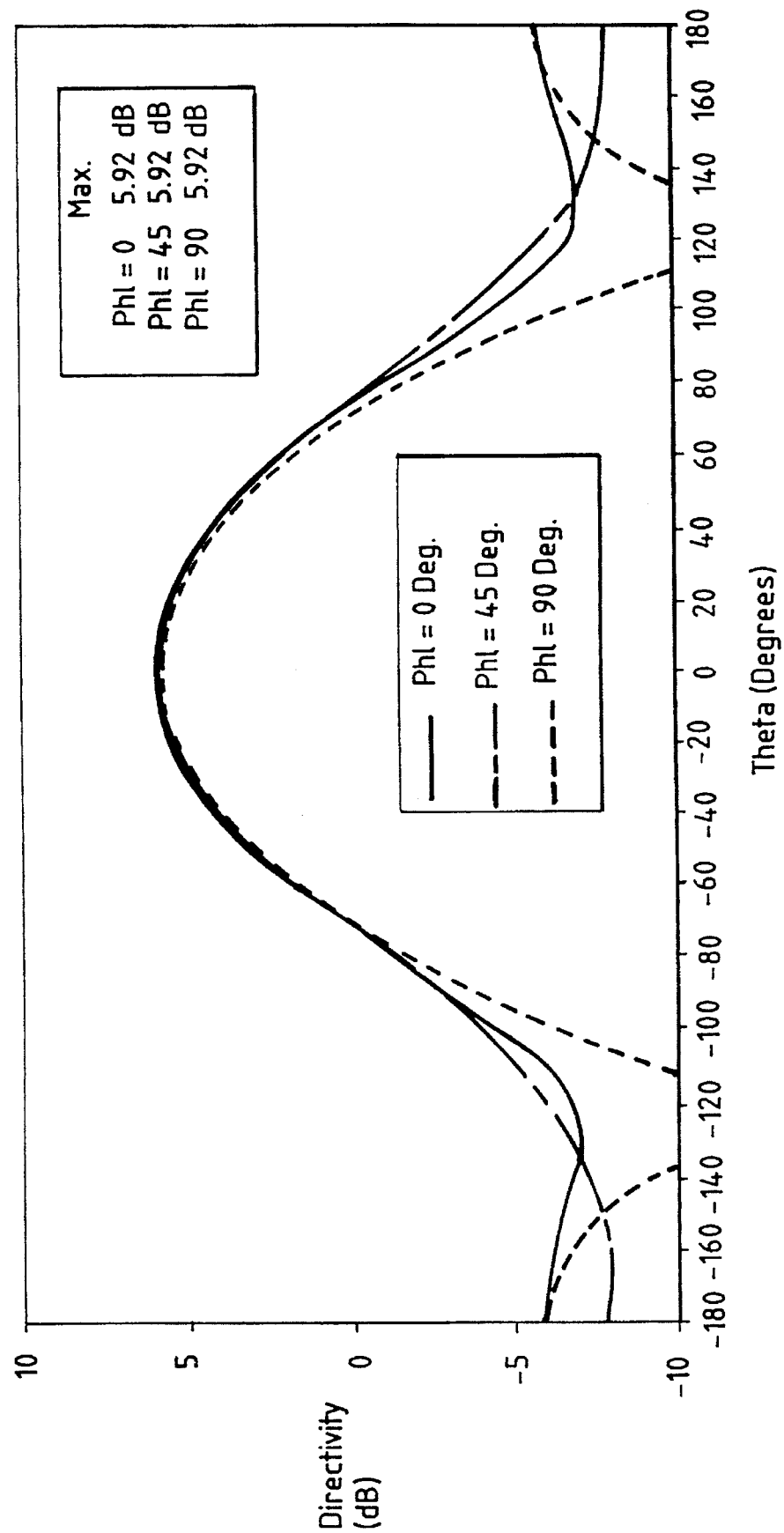
FIG. 4 is a graph showing the radiation pattern of an individual array element of the present invention.
Figure 5:
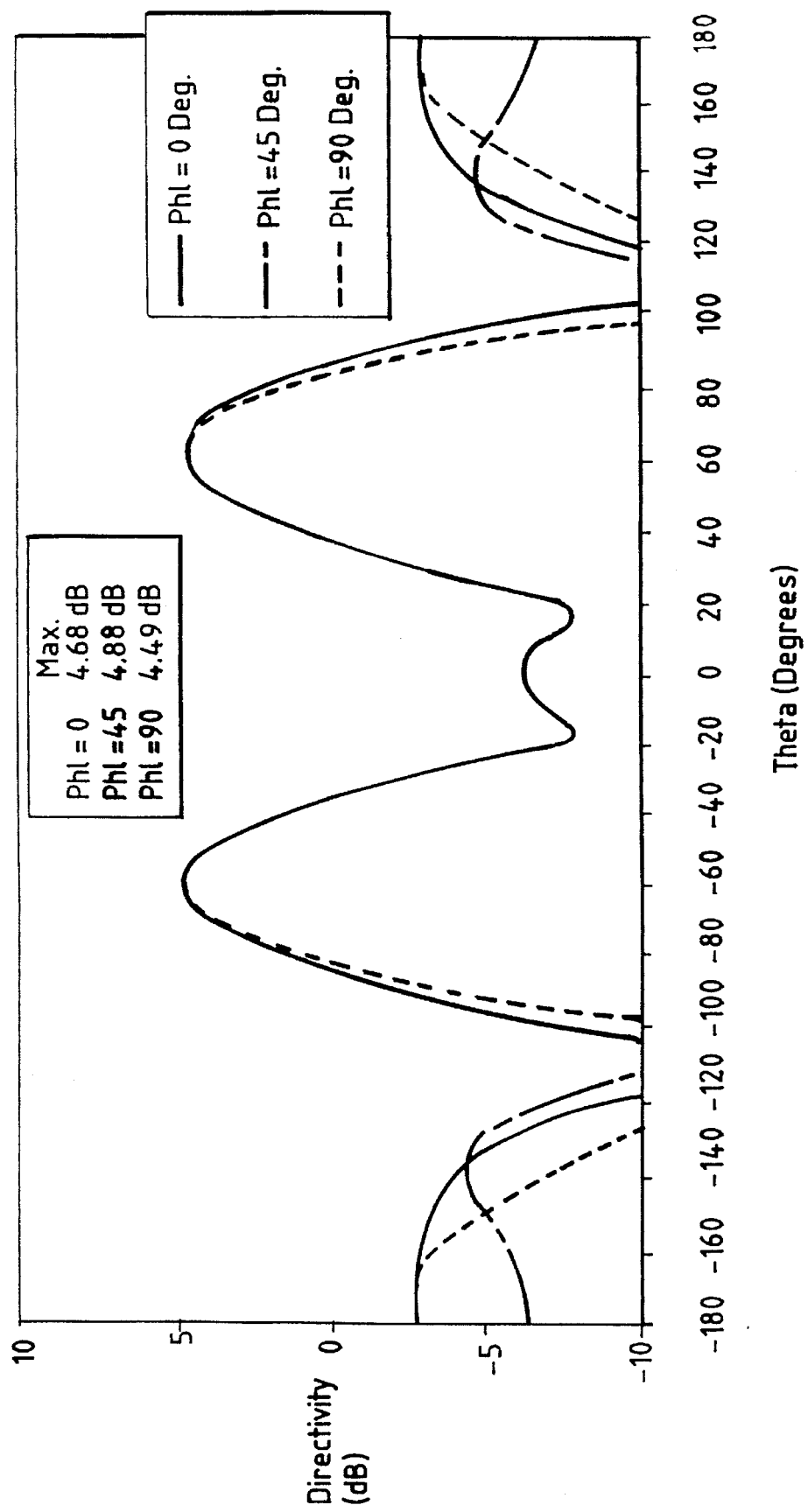
FIG. 5 is a graph showing the radiation pattern of the antenna array of the present invention.

In the preferred embodiment, each of antenna arrays 12 (i.e., 12a/12b) and 14 (i.e., 14a/14b) of the present invention generates an electromagnetic wave pattern substantially as illustrated in FIG. 5. Each antenna 12a/12b and 14a/14b generates peak gains at 60° and –60° from the helical axis. In addition, the gain on boresight is down 10–15 dB from the gain of a single unarrayed antenna element. The electromagnetic wave pattern generated by a single array element (i.e., 12a, 12b, 14a or 14b) is substantially as illustrated in FIG. 4. Moveover, the array maintains the substantial circular polarity of the individual quadrifilar helix element. In order to achieve the desired wave pattern, each helical conductor 32(a–d) and 34(a–d) extends a three-quarter turn with a length of 11.5 inches and a diameter of 5.74 inches. The array elements (12a and 12b in the first antenna and 14a and 14b in the second antenna) are separated by a distance of 66.25 inches and the helical conductors of each element in each antenna (for example, conductors 32(a–d) of element 12a and conductors 40(a–d) of element 12b in the first antenna) are fed signals 95° apart in phase. The radiation pattern illustrated in FIG. 5 is a preferred embodiment only and the antenna system of the present invention is capable of generating a variety of other radiation patterns by varying the physical dimensions and phase relationships appropriately.

Figure 6:
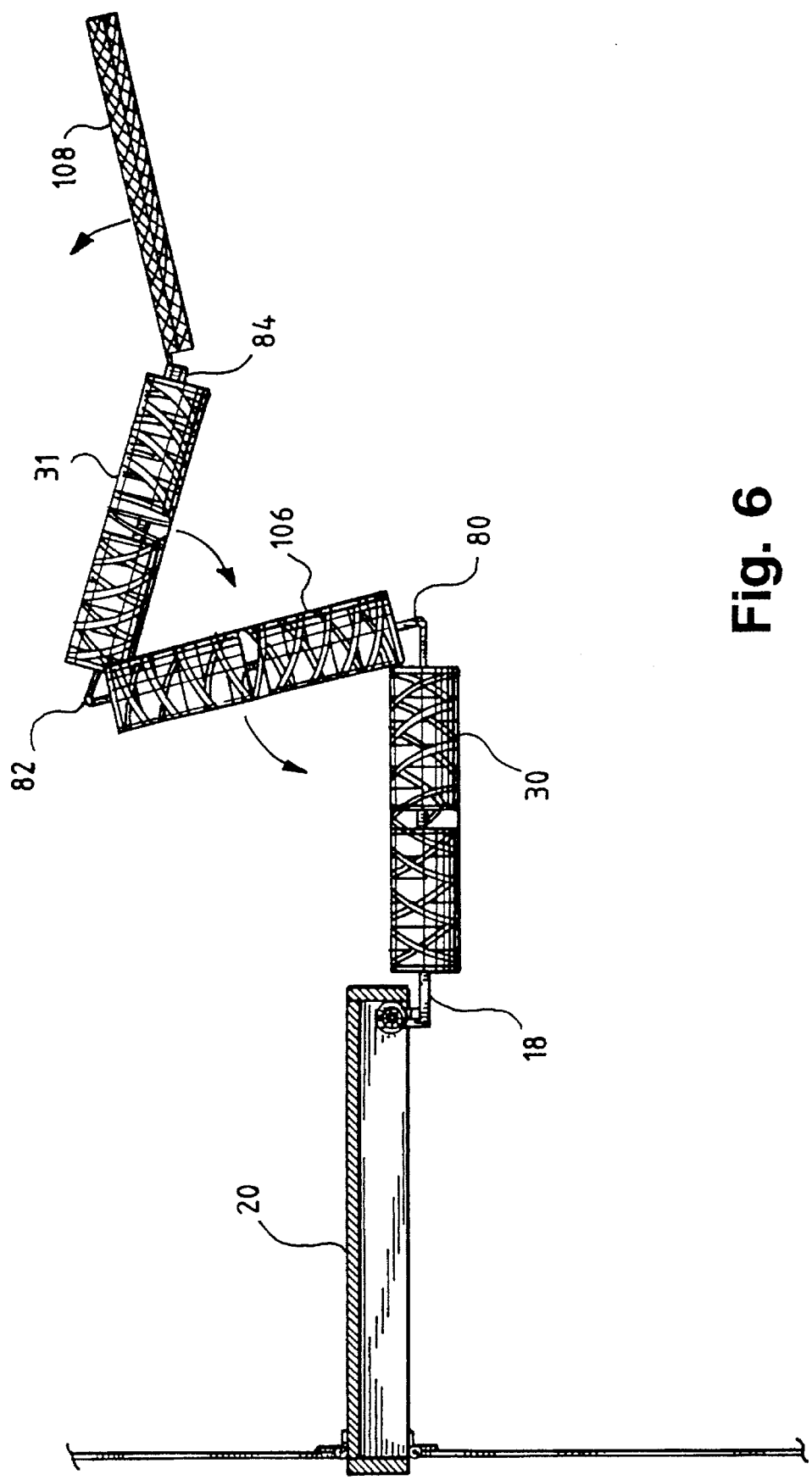
FIG. 6 is a sectional view of the antenna system of FIG. 7 in the process of folding for stowage.

It will be appreciated that the antenna structure of the present invention results in considerable savings of size and weight. By using the arraying techniques of the present invention, an antenna system of significantly shorter length and smaller diameter can be deployed. In addition, the antenna array breaks up what would be a large continuous volume in a single element design. As a result, the antenna system of the present invention is lighter than prior antennas. Also, as illustrated in FIG. 6, the spacing between array elements allows the addition of hinges 80, 82 and 84 in the boom 18 so that the antenna system can be easily folded for stowage.

Figure 8:
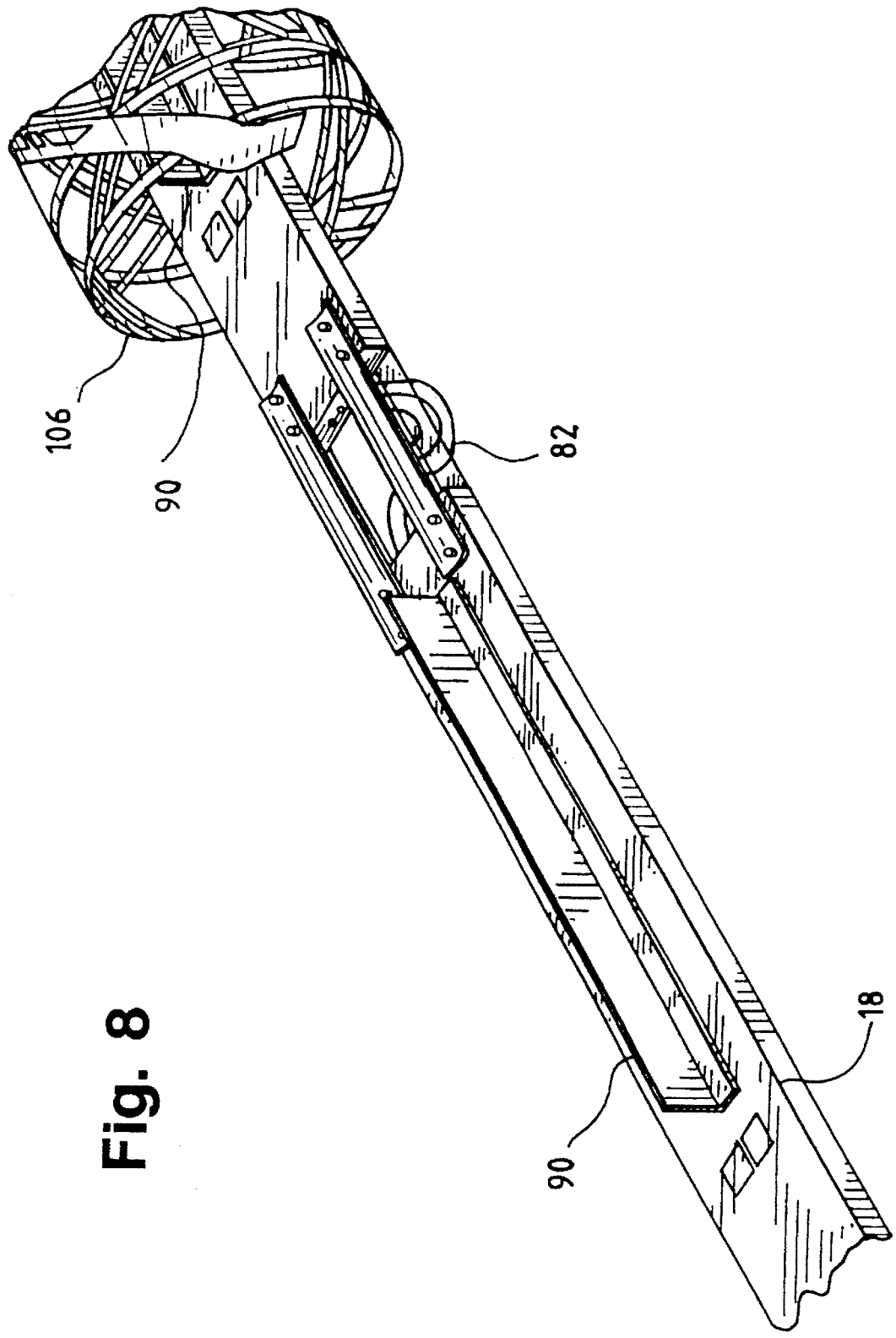
FIG. 8 is a partial perspective view of the antenna system of FIG. 7 with an antenna structure removed to illustrate the pop-up flaps of the boom structure.

In order to provide structural integrity and ease of fabrication, individual segments of boom 18 are rectangular in transverse cross section and are made of an at least partially conductive material. As a result, boom 18 produces a non-symmetrical distortion of the antenna radiation pattern. To minimize this distortion, a pair of pop-up flaps 90 having a conductive surface extend above and below (not shown) boom 18 within each antenna element of the array, as illustrated in FIG. 8. Pop-up flaps 90 give the boom 18 a uniform, plus-sign transverse cross section minimizing non-symmetrical distortion of the antenna radiation pattern.

Figure 7:
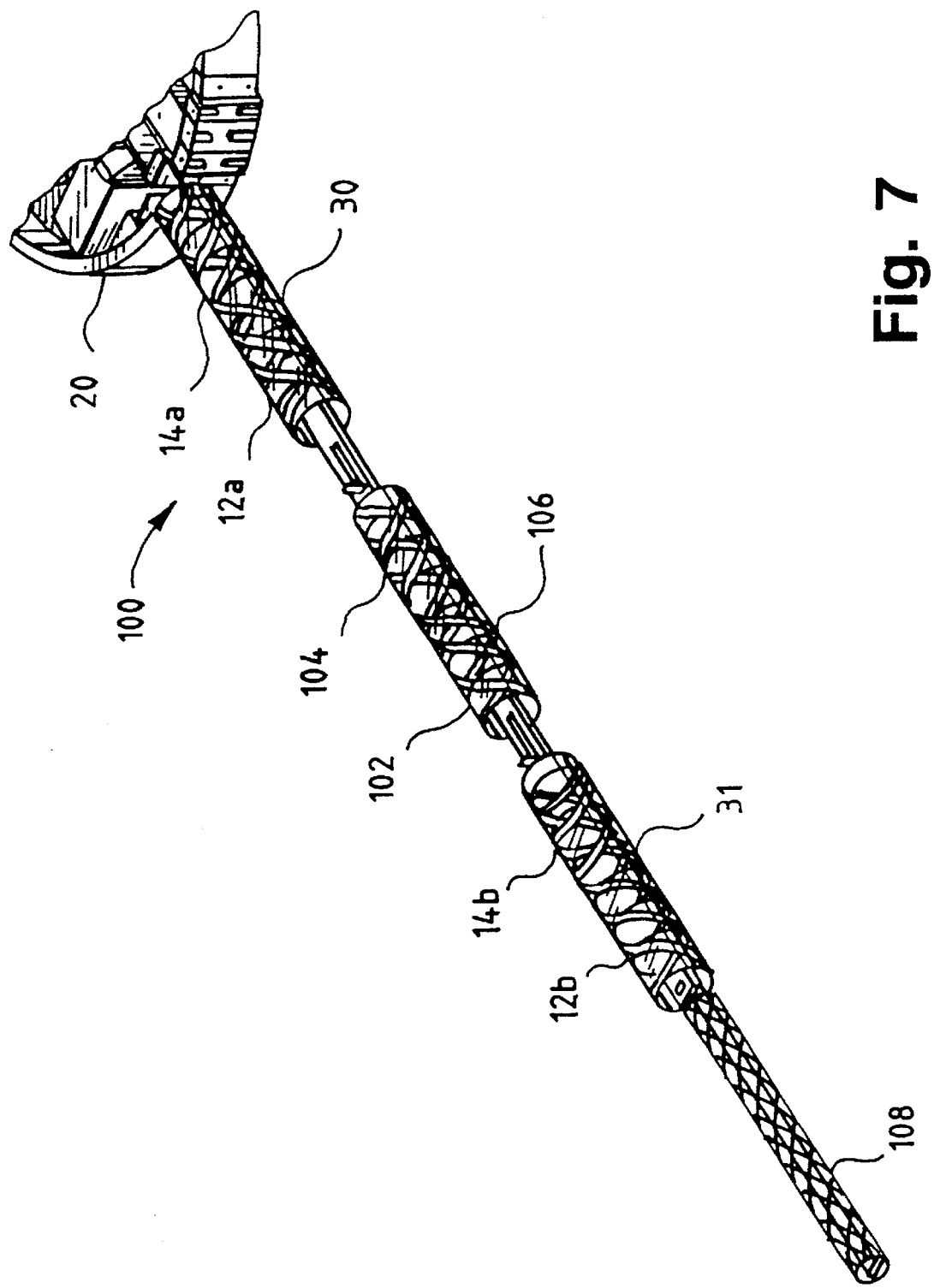
FIG. 7 is a perspective view of a second embodiment of the present invention shown in its deployed position and attached to a satellite.

In accordance with another aspect of the invention, the antenna system described herein allows multiple independent antennas to be deployed along a common axis. For example, as illustrated in FIG. 7, antenna system 100 includes first and second axially arrayed antennas 12 and 14, and third and fourth interleaved antennas 102 and 104 comprised of structure 106 disposed in the gap between the antenna array structures 30 and 31. In operation, the left-handed elements of each array structure 12a and 12b combine to form an antenna 12 that emits a left circularly polarized wave and the right-handed elements 14a and 14b combine to form an antenna 14 that emits a right circularly polarized wave. Thus, the arrayed structures 30 and 31 form two antennas, each transmitting independent signals and emitting an electromagnetic wave with the highly desirable wave pattern illustrated in FIG. 5. In addition, one or more independent antenna structures (e.g., UHF antenna 108 as shown in FIG. 7) can be added along boom 18 beyond the end of antenna structure 31.

In the preferred embodiment, the interleaved antenna system includes a pair of completely separate, electromagnetically isolated antenna elements from the arrayed antenna system. Antenna structure 106 is comprised of a left handed helical antenna element 102 and a right handed helical element 104. When fed an independent signal, each antenna element 102 and 104 radiates a circularly polarized wave of opposite polarity in a pattern similar to that illustrated in FIG. 4. As a result, there is little or no interaction between the radiation pattern of the interleaved antenna system and the radiation pattern generated by the antenna array as illustrated in FIG. 5. In the preferred embodiment, antenna elements 102 and 104 are quadrifilar helical antennae identical to the antenna array elements 12a,b and 14a,b as described above. However, a variety of different antenna structures can also be used.

Although the illustrated embodiment describes a single antenna structure 106 disposed between arrayed structures 30 and 31, many other configurations are possible. For example, an axial array comprised of several antenna structures can be disposed in the spacing between the array structures 30 and 31. Moreover, if the array comprises more than two antenna structures, multiple independent antenna systems can be disposed in the additional gaps created. In addition, each antenna array could include more than two elements.

While illustrative embodiments of the invention are shown in the drawings and are described in detail herein, the invention is susceptible of embodiment in many different forms. It should be understood that the present disclosure is to be considered as an exemplification of the principles of the invention and is not intended to limit the invention to the embodiment illustrated.

I claim:

1. An antenna system comprising:

a plurality of antenna structures which include a first and second antenna element, said first antenna element having at least one helical conductive element wound in a left hand direction around a common axis, and said second antenna element having at least one helical conductive element wound in a right hand direction around said common axis, said antenna structures being arrayed axially spaced from one another along said common axis;

feeding means for feeding a common signal to each of said antenna elements, said feeding means comprising phase shifting means for shifting the phase of said common signal with respect to each of said antenna elements; and wherein said first and second antenna elements further comprise quadrifilar helical antennas, each antenna having four orthogonal conductive elements helically wound around said common axis.

2. An antenna system according to claim 1 wherein said feeding means includes coupler elements for exciting said orthogonal conductive elements of each said quadrifilar helical antenna in phase quadrature.

3. An antenna system comprising:

a plurality of antenna structures which include at least one antenna element having at least one conductive element helically wound in a first direction around a common axis, said antenna structures being arrayed axially spaced from one another along said common axis;

feeding means for feeding a common signal to each of said antenna elements, said feeding means comprising phase shifting means for shifting the phase of said common signal with respect to each of said antenna elements; and wherein said antenna elements are quadrifilar helical antennas having four orthogonal conductive elements helically wound around said common axis.

4. An antenna system according to claim 3 wherein said feeding means includes coupler elements for exciting said orthogonal conductive elements of said quadrifilar helical antenna elements in phase quadrature.

5. An antenna system comprising:

a plurality of antenna structures which include at least one antenna element having at least one conductive element helically wound in a first direction around a common axis, said antenna structures being arrayed axially spaced from one another along said common axis;

feeding means for feeding a common signal to each of said antenna elements, said feeding means comprising phase shifting means for shifting the phase of said common signal with respect to each of said antenna elements;

at least one independent, helical antenna element disposed along said common axis between said antenna structures;

wherein said independent, helical antenna element further comprises at least one antenna structure having both a right-handed helical element and a left-handed helical element and wherein said left-handed antenna element and said right-handed antenna element are quadrifilar helices having four helically wound conductive elements.

6. A self-deploying axial antenna system having multiple independent antennas comprising:

a first antenna comprising a plurality of antenna elements, each having at least one conductive element helically wound around a common axis, said antenna elements being arrayed axially spaced from one another along said common axis;

first feeding means for feeding a common signal to each of said antenna elements wherein said feeding means comprises a phase shifting means for shifting the phase of said common signal with respect to each of said elements;

a second antenna disposed along said common axis between said antenna elements of said first antenna;

second feeding means for feeding a signal to said second antenna; and a foldable boom structure for mounting said first and second antennas, said boom structure having at least one hinge for folding said boom structure for stowage.

7. An antenna system comprising:

a plurality of antenna structures comprising at least one quadrifilar helical antenna element having four orthogonal conductors helically wound around a common axis, said antenna structures being arrayed axially spaced from one another along said common axis; and feeding means for feeding a common signal to at least one antenna element of each said antenna structure, said feeding means comprising phase shifting means for shifting the phase of said common signal with respect to said antenna elements;

wherein said antenna structures further comprise a first and second antenna element, said first antenna element having four orthogonal conductors wound in a left-hand direction, and said second antenna element having four orthogonal conductors wound in a right-hand direction.

8. An antenna system comprising:

a plurality of antenna structures comprising at least one quadrifilar helical antenna element having four orthogonal conductors helically wound around a common axis, said antenna structures being arrayed axially spaced from one another along said common axis;

feeding means for feeding a common signal to at least one antenna element of each said antenna structure, said feeding means comprising phase shifting means for shifting the phase of said common signal with respect to said antenna elements; and at least one independent antenna element disposed along said common axis between said antenna structures, said independent antenna element further comprises both a right-handed helical conductor and a left-handed helical conductor.

9. An antenna system according to claim 8 wherein said left-handed helical conductor and said right-handed helical conductor comprise quadrifilar helices having four helically wound conductors.

10. An antenna system comprising:

a first antenna array including a plurality of helical antenna elements disposed along a common axis spaced axially from one another along said common axis;

a second antenna array comprising one or more helical antenna elements sharing said common axis of said first antenna array;

first feeding means for feeding a common signal to each of the antenna elements of said first antenna array, said feeding means comprising phase shifting means for shifting the phase of said common signal with respect to each of said antenna elements of said first antenna array;

second feeding means for feeding a second signal to each of the antenna elements of said second antenna array;

wherein each helical antenna element of said first antenna array comprises a first helical conductive element wound in a left-hand direction and a second helical conductive element wound in a right-hand direction, and said first and second helical conductive elements comprise quadrifilar helical antennas having four orthogonal conductive elements helically wound around said common axis.

* * * * *